Oct. 24, 1939.　　　J. F. WATSON　　　2,177,396
MILK BOTTLE
Filed April 18, 1936　　2 Sheets-Sheet 1
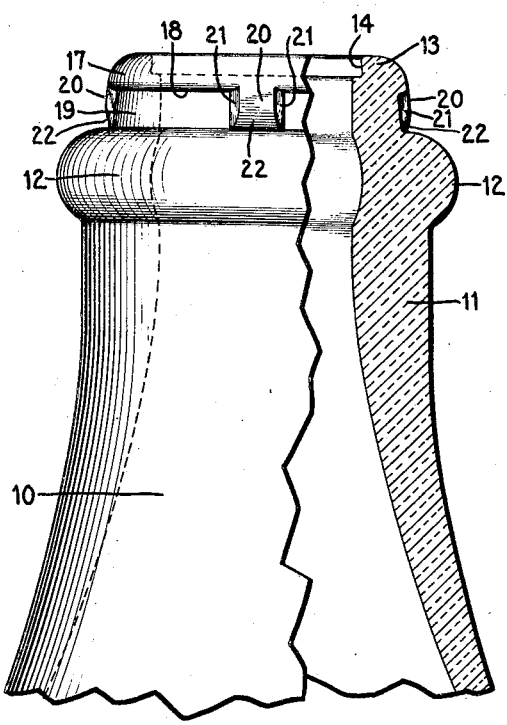
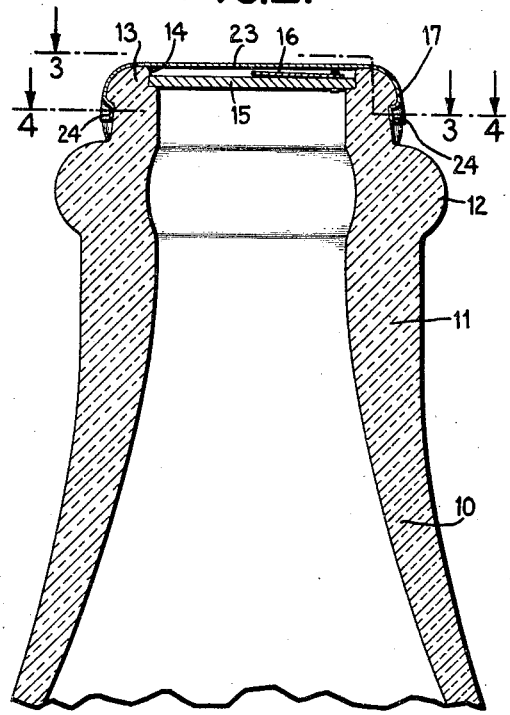
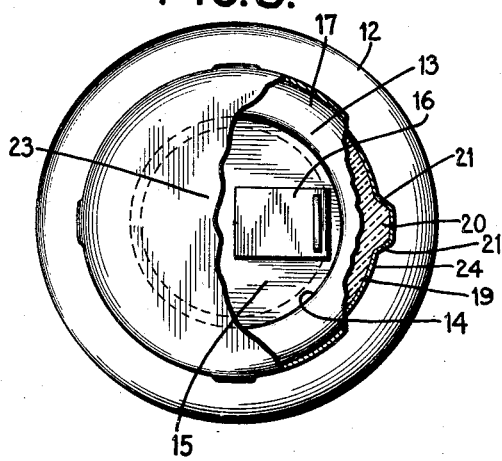
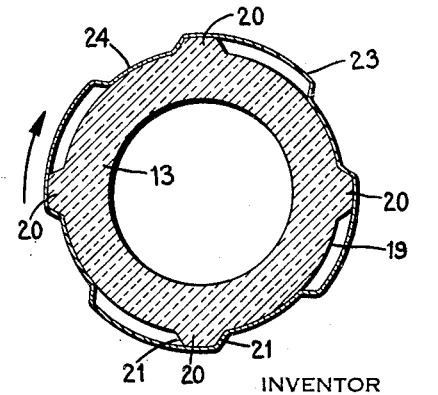
INVENTOR
JOHN F. WATSON
BY Maxwell Barus
ATTORNEY Oct. 24, 1939.  J. F. WATSON  2,177,396
MILK BOTTLE
Filed April 18, 1936   2 Sheets-Sheet 2
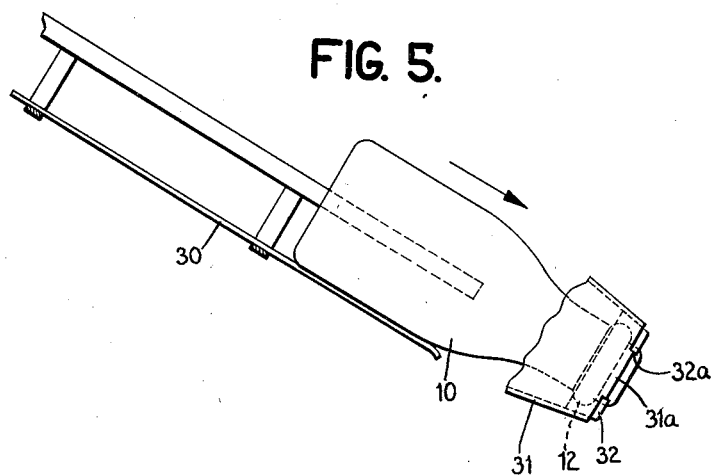
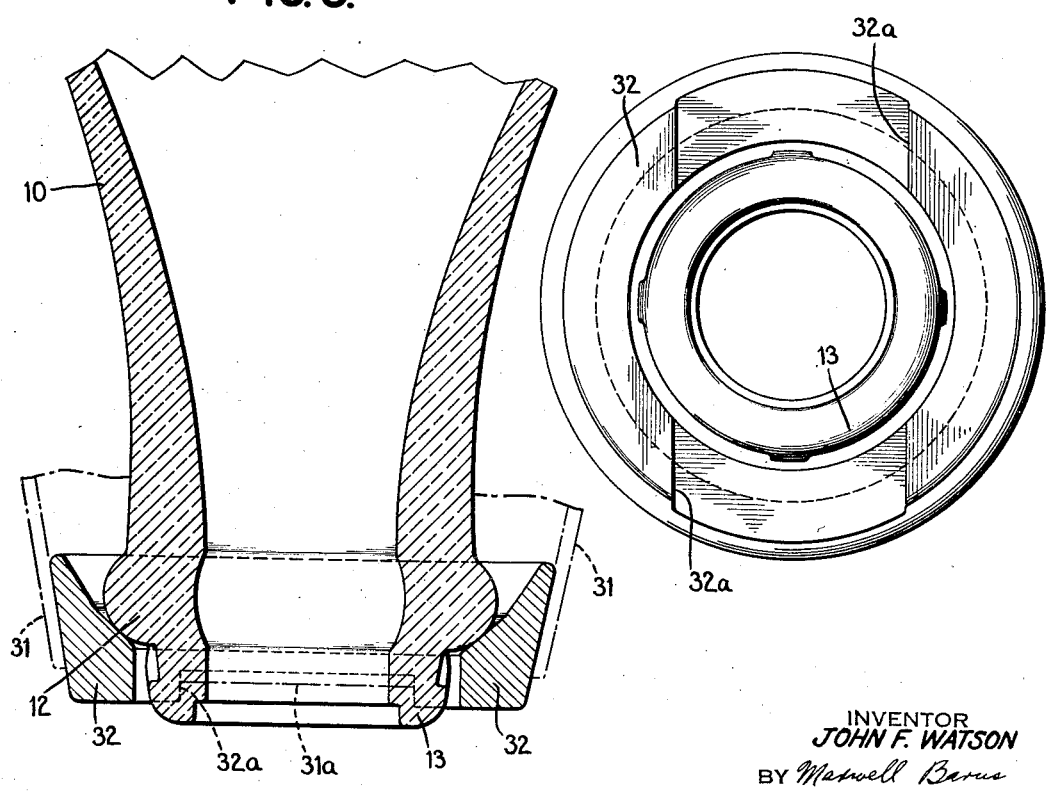
INVENTOR
*JOHN F. WATSON*
BY *Maxwell Barus*
ATTORNEY Patented Oct. 24, 1939

2,177,396

UNITED STATES PATENT OFFICE 2,177,396

MILK BOTTLE

John F. Watson, Maplewood, N. J., assignor to The Borden Company, New York, N. Y., a corporation of New Jersey Application April 18, 1936, Serial No. 75,033

8 Claims. (Cl. 215—31)

This invention relates to an improved and advantageous construction for milk bottles and the like and particularly to features concerned with sealing and protecting the mouth of such bottles.

It has for a long time been a major problem to devise a milk bottle wherein the mouth of the bottle would be adequately protected against breakage, contamination and tampering and which would at the same time be simple and inexpensive.

In milk bottles which are commonly used, the mouth is exposed to the danger of being broken or chipped in handling and washing and the hood-like seals commonly provided for protecting against contamination and tampering are large, cumbersome, and expensive.

It is an important object of my invention to provide a bottle top, of simple and economical construction, which is sufficiently rugged to withstand rough usage and which affords maximum protection to the pouring lip and mouth construction suitable for use with a relatively small and inexpensive sealing means.

A further object resides in the provision of a bottle top construction attaining the foregoing advantages while at the same time enabling the employment of a sealing means which is simple and efficient, affords adequate sealing protection, is readily removable when desired, is protected from accidental removal, and makes any tampering apparent.

Further objects and advantages of this invention will be more apparent from a description of one embodiment thereof illustrated in the drawings, in which Figure 1 is a side elevation of the top portion of a bottle with the right side broken away to better illustrate its construction.

Figure 2 is a vertical cross section through the top of the bottle shown in Figure 1 but illustrating the closure members in place.

Figure 3 is a top plan view partly in section, taken on the line 3—3 of Fig. 2.

Figure 4 is a horizontal cross section taken on the line 4—4 of Fig. 2.

Figure 5 illustrates somewhat diagrammatically a bottle which has just been received in a bottle washing machine.

Figure 6 is a vertical cross section of an inverted bottle supported by a ring member in position to be washed.

Figure 7 is a bottom plan view of the bottle and ring shown in Fig. 6.

Referring more particularly to the drawings, numeral 10 illustrates generally the top portion of a bottle which may be made of glass or other suitable material. The wall thickness of the bottle is shown gradally increasing towards and in the neck portion 11. A protecting ring or annular flange 12 extends outwardly from the exterior surface of the neck 11 near the mouth of the bottle. This ring protects the portion of the bottle thereabove from blows during delivery and washing, and prevents the hand from slipping to and contaminating the pouring lip 13 of the bottle when the neck is grasped to hold the bott'e for delivery or pouring. The ring 12 also protects the closure 23 from accidental removal or loosening by the hand when grasping the bottle neck. The pouring lip 13 extends a short distance above the ring 12 and preferably has an external diameter which is less than that of the neck 11.

The pouring lip 13 may be provided on its inner surface with a suitable groove 14 to receive a closure member 15 of any suitable construction which may, if desired, be provided with a lifting tab 16. The top and exterior surface of this lip 13 is formed with a downwardly curving surface 17 which is cut away at 18 to provide an annular groove 19. Spaced around this groove and extending downwardly from the top rim of the pouring lip 13 are a plurality of lugs 20. The lugs 20 preferably bulge outwardly slightly beyond the outside edge of the pouring lip and are preferably provided with tapering side walls 21, 21 and inwardly curving lower surfaces 22 which preferably merge into the protective ring 12. A suitable cap 23 of aluminum foil or other suitable sheet material may be placed over the pouring section with its skirt extending at least part way down into the groove 19. This skirt portion may be crimped, as at 24, to hold it in place. After it has been properly applied any tampering with the cap 23 distorts its skirt and makes apparent the fact that tampering has occurred.

When it is desired to open a bottle sealed as described above, the cap 23 may be grasped firmly with the fingers and rotated with respect to the bottle. The lugs 20 thus serve to expand the crimped skirt 24 and when this has been fully expanded, the cap 23 may be easi'y lifted off.

Figure 4 illustrates the action of these lugs in expanding the skirt 24 of the cap 23, and illustrates the position of the skirt after rotation of the cap 23 through one eighth of a turn with respect to the bottle in the direction indicated by the arrow.

It will be seen that with this construction the protective cap 23 completely covers all parts of the pouring lip 13 which are apt to come in contact with the milk or other liquid as it is poured. All dust and other foreign matter is prevented from accumulating above the closure 15, or in any portion of the groove 14. By making the upwardly extending section 13 of substantially smaller diameter than the ring 12, the cap 23, as previously noted, is in turn protected against the possibility of accidental removal or loosening when the bottle is picked up. Since the bumper ring 12 extends outwardly from the bottle a considerable distance beyond the pouring lip 13 and the lugs 20, these parts which may be of a more delicate construction are protected from breaking or chipping, or from all risk that glass splinters may contaminate the liquid contents. If desired, a sealing band of any suitable material, such as paper or metal, may be applied around the groove 19 over the skirt 24 of the cap 23 to further prevent tampering.

As has been noted, the external diameter of the lip 13 is not only less than that of the ring 12 but is also preferably less than the external diameter of the neck 11. The latter is of gradually increasing thickness as illustrated, providing a relatively smooth interior neck surface, and merging into and materially strengthening the ring 12 to withstand rough usage.

The location of the lugs 20 in a groove between two flanges lends a maximum amount of protection against accidental blows and by merging the lugs with both flanges, the lugs are effectively reinforced.

Figures 5 to 7 illustrate an important advantage of my improved construction in connection with machines used for washing the bottles. In machines commonly employed for this operation, the bottles are allowed to slide neck-first down a chute 30. A container 31, made of metal and provided with a pair of inwardly extending lugs 31a to support the bottle in inverted position, stops the descent of the bottle in the chute 30, the mouth of the bottle normally striking these lugs. The bottles are then tipped up to a vertical position within the container and a tubular spray nozzle is automatically inserted through the bottle neck to effect the washing and rinsing.

By employing an annular ring 32 fitted over the lugs 31a by means of the grooves 32a therein, the bottles are effectively centered when they strike this ring and the force of the impact is taken by the flange 12 of the bottles rather than by the pouring rim 13. The small pouring section 13 projects through the opening in the ring 32 and is positively held in correct position for insertion of the tubular spray nozzle. A further advantage of this bottle construction is the cushioning effect produced as the bottle slides down the chute 30 into the ring 32. That is, if the bottles strike the inner surface of the ring at one side they hit it only with a glancing instead of a direct blow and then fall to the correct centered position. It will thus be seen that bottles constructed in accordance with my invention may be handled in washing apparatus which is already in use, with greater facility and with less breakage.

Modifications of this embodiment coming within the scope of the appended claims will be apparent to those skilled in the art.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A milk bottle having a neck portion, an outwardly extending annular protective flange near the top of the neck, a pouring section immediately above said flange including an annular pouring rim and a groove between said flange and rim, and a plurality of lugs disposed in said groove, said flange extending outwardly beyond said lugs and pouring rim to protect the same.

2. A milk bottle having a neck portion, an outwardly extending annular protective flange near the top of the neck, a groove immediately above said flange, an annular pouring rim above said groove, and a plurality of lugs disposed in said groove, the external diameter of said rim and groove being substantially less than the external diameter of the remainder of the neck.

3. A milk bottle having a neck portion, the walls of which gradually increase in thickness towards the top, an annular flange projecting from the exterior of said neck portion near the top thereof, above said flange a circular pouring rim of lesser diameter than the bottle neck, a groove between said rim and flange, and a plurality of lugs having tapered sides disposed in said groove and merging with said rim and flange.

4. A milk bottle adapted to be capped with a pliable metal cover member having a skirt molded about the bottle top, said bottle having an outwardly extending annular flange near the mouth thereof, and an upwardly extending pouring section immediately above said flange, the external diameter of which is substantially less than that of the remainder of the bottle, said section being provided with a groove and a plurality of lugs in said groove arranged to expand the skirt of such a cover member upon rotation of said member with respect to the bottle.

5. A milk bottle having a neck portion, an annular protective flange near the top of the neck extending outwardly beyond the rest of the neck, a groove immediately above said flange, an annular pouring rim above said groove, and a plurality of lugs disposed in said groove and merging into said rim and said flange.

6. A milk bottle adapted to be capped with a pliable metal cover member having a skirt molded about the bottle top, said bottle having an outwardly extending annular flange near the mouth thereof, and an upwardly extending pouring section immediately above said flange, the external diameter of which is substantially less than that of the remainder of the bottle, said section being provided with a groove and a plurality of lugs in said groove, said lugs being formed with a portion thereof bulging out beyond the outermost edge of the pouring section so as to expand the skirt of such a cover member upon rotation of said member relative to said bottle.

7. In combination with a milk bottle having an outwardly extending annular flange near the mouth thereof, and an upwardly extending pouring rim immediately above said flange provided with irregularities in the outer surface thereof and having an external diameter substantially less than that of the bottle neck below said flange, a cap of pliable metal covering said rim and having a skirt molded over said irregularities so that it may be loosened from the bottle by rotation relative to the rim, the skirt of said cap being protected by said flange against accidental loosening.

8. The combination with a milk bottle having a neck portion, an annular protective flange near the top of and extending outwardly beyond said neck portion, a pouring rim above said flange having a groove adjacent said flange, and a plurality of lugs disposed in said groove, of a cap of pliable metal covering said pouring rim and having an annular skirt molded around said lugs to secure the cap in place but arranged to expand said skirt upon relative rotation of said bottle and cap, said flange serving to protect said lugs and the lower edge of said skirt.

JOHN F. WATSON.